United States Patent
Muraguchi et al.

(10) Patent No.: US 7,637,097 B2
(45) Date of Patent: Dec. 29, 2009

(54) CONTROL APPARATUS AND CONTROL METHOD FOR INTERNAL COMBUSTION ENGINE PROVIDED WITH SECONDARY AIR SUPPLY

(75) Inventors: Tomokazu Muraguchi, Okazaki (JP); Akito Onishi, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 226 days.

(21) Appl. No.: 10/578,923

(22) PCT Filed: Aug. 15, 2005

(86) PCT No.: PCT/IB2005/002826

§ 371 (c)(1),
(2), (4) Date: May 9, 2006

(87) PCT Pub. No.: WO2006/024950

PCT Pub. Date: Mar. 9, 2006

(65) Prior Publication Data

US 2007/0051093 A1   Mar. 8, 2007

(30) Foreign Application Priority Data

Aug. 30, 2004   (JP)   ............................. 2004-249915

(51) Int. Cl.
*F01N 3/00*   (2006.01)
(52) U.S. Cl. .............................. 60/277; 60/274; 60/289; 60/290; 60/293; 60/305; 60/307
(58) Field of Classification Search ................... 60/277, 60/289, 290, 304, 305, 306, 307, 308, 274, 60/293; 123/295, 305
See application file for complete search history.

(56) References Cited

U.S. PATENT DOCUMENTS 5,113,651 A * 5/1992 Kotzan et al. ................. 60/274

(Continued)

FOREIGN PATENT DOCUMENTS

DE   103 44 910 A1   5/2004

(Continued)

OTHER PUBLICATIONS

Korean Language Version of Notice of Patent Grant, Appln. No. KR 10-2006-7010361 issued Jun. 26, 2007.

(Continued)

*Primary Examiner*—Tu M Nguyen
(74) *Attorney, Agent, or Firm*—Kenyon & Kenyon LLP (57) ABSTRACT

An ECU executes a program including a step (S102) of limiting the maximum opening amount of a throttle valve to TH (1) when failure has occurred in a pressure sensor ("YES" in step S100); a step (S202) of limiting the maximum opening amount to TH (2) when open failure has occurred in at least one of two vacuum pressure ASVs provided for banks of a V-type engine, and an electromagnetic ASV ("YES" in step S200); a step (S302) of limiting the maximum opening amount to TH (3) when open failure has occurred in both of the vacuum pressure ASVs ("YES" in step S300); a step (S402) of limiting the maximum opening amount to TH (4) when open failure has occurred in one of the vacuum pressure ASVs ("YES" in step S400); and a step (S502) of reducing the throttle valve opening amount TH to the limited maximum opening amount.

8 Claims, 3 Drawing Sheets

U.S. PATENT DOCUMENTS

| | | | |
|---|---|---|---|
| 5,119,631 A * | 6/1992 | Kayanuma et al. | 60/274 |
| 5,140,810 A * | 8/1992 | Kuroda | 60/274 |
| 5,235,956 A * | 8/1993 | Yoshizaki | 123/585 |
| 5,325,663 A * | 7/1994 | Itoh | 60/274 |
| 5,388,401 A * | 2/1995 | Nishizawa et al. | 60/274 |
| 5,400,591 A * | 3/1995 | Aramaki | 60/274 |
| 5,809,773 A * | 9/1998 | Gottberg | 60/274 |
| 5,852,929 A | 12/1998 | Kato et al. | |
| 6,609,364 B2 * | 8/2003 | Litorell et al. | 60/274 |
| 6,708,668 B2 * | 3/2004 | Yoshida et al. | 123/295 |
| 6,830,043 B2 * | 12/2004 | Morinaga et al. | 123/698 |
| 6,912,845 B2 * | 7/2005 | Hirooka | 60/285 |

FOREIGN PATENT DOCUMENTS

| | | |
|---|---|---|
| EP | 0 663 516 A2 | 7/1995 |
| JP | 08-165942 A | 6/1986 |
| JP | 63-212750 A | 9/1988 |
| JP | 03-015619 A | 1/1991 |
| JP | 2003/083048 A | 3/2003 |
| JP | 2003-314263 A | 11/2003 |
| JP | 2004-285910 A | 10/2004 |
| KR | 10-1998-050278 A | 9/1998 |
| KR | 10-0249882 B | 12/1999 |
| KR | 10-0408111 B | 11/2003 |

OTHER PUBLICATIONS

Korean Translation of Notice of Patent Grant, Appln. No. KR 10-2006-7010361 issued Jun. 26, 2007.

* cited by examiner

CONTROL APPARATUS AND CONTROL METHOD FOR INTERNAL COMBUSTION ENGINE PROVIDED WITH SECONDARY AIR SUPPLY

This is a 371 national phase application of PCT/IB2005/002826 filed 15 Aug. 2005, claiming priority to Japanese Patent Application No. JP 2004-249915 filed 30 Aug. 2004, the contents of which are incorporated herein by reference.

BACKGROUND OF THE INVENTION

1. Field of the Invention

The invention relates to a control apparatus and control method for an internal combustion engine. More specifically, the invention relates to a control apparatus and control method for an internal combustion engine in which a secondary air supply apparatus is provided.

2. Description of the Related Art

A secondary air supply apparatus is known, which supplies an exhaust manifold of an engine with secondary air delivered under pressure from an air pump so that CO and HC in exhaust gas are burned and changed to $CO_2$ and $H_2O$ due to chemical reaction.

Japanese Patent Application Publication No. JP 2003-83048 discloses a secondary air supply apparatus in which it can be determined whether an abnormality has occurred in a component of the secondary air supply apparatus. The secondary air supply apparatus disclosed in the Japanese Patent Application Publication No. JP 2003-83048 includes a secondary air supply passage for supplying secondary air to a portion upstream of an exhaust gas control device in an exhaust system of an internal combustion engine; a opening/closing portion which opens/closes the secondary air supply passage; a check valve which is provided downstream of the opening/closing portion; a pressure sensor which is provided in the secondary air supply passage; and an abnormality detecting portion which detects an abnormality in the component based on a pressure value detected by the pressure sensor and a pressure change value.

In the secondary air supply apparatus disclosed in the Japanese Patent Application Publication No. JP 2003-83048, since the pressure value and the pressure change value are obtained using the pressure sensor, a failure mode of each component can be determined in detail based on combination of the pressure value and the pressure change value.

However, in the secondary air supply apparatus disclosed in the Japanese Patent Application Publication No. JP 2003-83048, no consideration is given to a measure which should be taken when failure occurs in the component. Therefore, there is a problem that secondary failure may be caused due to failure in the component.

SUMMARY OF THE INVENTION

The invention is made in order to solve the aforementioned problem. Accordingly, it is an object of the invention to provide a control apparatus and control method for an internal combustion engine, which can suppress occurrence of secondary failure. It is another object of the invention to provide a control apparatus and control method for an internal combustion engine, which can reduce the possibility that an occupant feels uncomfortable due to failure in a secondary air supply apparatus.

A first aspect of the invention relates to a control apparatus for an internal combustion engine provided with a secondary air supply apparatus that supplies secondary air to a portion upstream of an exhaust gas control device in an exhaust system. The control apparatus includes a detector that detects failure in the secondary air supply apparatus; and a controller that limits an amount of air introduced into the internal combustion engine to a predetermined amount when failure in the secondary air supply apparatus is detected by the detecting means.

According to the first aspect of the invention, when failure in the secondary air supply apparatus is detected, the amount of the air introduced into the internal combustion engine is limited to the predetermined amount. Thus, when failure occurs in the secondary air supply apparatus, an amount of exhaust gas can be reduced. Therefore, for example, when the exhaust gas flows back to the secondary air supply apparatus due to failure in a component constituting the secondary air supply apparatus, it is possible to reduce an amount of the gas flowing back to the secondary air supply apparatus, and to suppress an increase in a temperature of the secondary air supply apparatus, which is caused by the exhaust gas. As a result, it is possible to provide a control apparatus for an internal combustion engine, which can suppress occurrence of secondary failure.

According to a second aspect of the invention, in the control apparatus according to the first aspect of the invention, the controller may reduce the amount of the air introduced into the internal combustion engine to the predetermined amount in a stepwise manner. With this configuration, the amount of the air introduced into the internal combustion engine is reduced to the predetermined amount in a stepwise manner. Thus, it is possible to suppress a rapid decrease in output of the internal combustion engine. Therefore, it is possible to suppress a rapid change in an operating state of the internal combustion engine. As a result, it is possible to provide the control apparatus for an internal combustion engine, which can reduce the possibility that an occupant feels uncomfortable due to failure in the secondary air supply apparatus.

According to a third aspect of the invention, in the control apparatus according to the first aspect or the second aspect of the invention, the controller may reduce the amount of the air introduced into the internal combustion engine to the predetermined amount at a predetermined change rate. With this configuration, the amount of the air introduced into the internal combustion engine is reduced to the predetermined amount at the predetermined change rate. Thus, it is possible to suppress a rapid decrease in output of the internal combustion engine. Therefore, it is possible to suppress a rapid change in an operating state of the internal combustion engine. As a result, it is possible to provide the control apparatus for an internal combustion engine, which can reduce the possibility that an occupant feels uncomfortable due to failure in the secondary air supply apparatus.

According to a fourth aspect of the invention, in the control apparatus according to any one of the first aspect to the third aspect of the invention, the internal combustion engine may include plural cylinders. The secondary air supply apparatus may includes i) a first opening/closing valve which opens/closes a first air passage through which air discharged from an air pump flows; ii) a second opening/closing valve which opens/closes a second air passage that is connected to the first air passage at a portion downstream of the first opening/closing valve, and that is connected to an exhaust passage leading to a predetermined cylinder among the plural cylinders; and iii) a third opening/closing valve which opens/closes a third air passage that is connected to the first air passage at a portion downstream of the first opening/closing valve, and that is connected to an exhaust passage leading to a cylinder different from the predetermined cylinder to which the exhaust passage connected to the second air passage leads. The detector may detect presence or absence of failure in each of the first opening/closing valve, the second opening/closing valve, and the third opening/closing valve. The controller may limit the amount of the air introduced into the internal combustion engine according to presence or absence of failure in each of the first opening/closing valve, the second opening/closing valve, and the third opening/closing valve.

According to the fourth aspect of the invention, the first air passage is opened/closed by the first opening/closing valve, the second air passage is opened/closed by the second opening/closing valve, and the third air passage is opened/closed by the third opening/closing valve. The amount of the air introduced into the internal combustion engine is limited according to presence or absence of failure in each of the first opening/closing valve, the second opening/closing valve, and the third opening/closing valve. For example, when failure has occurred in at least one of the second opening/closing valve and the third opening/closing valve, and the first opening/closing valve, exhaust gas flowing back to the secondary air supply apparatus passes through the first air passage. Therefore, an amount of exhaust gas flowing back to the secondary air supply apparatus becomes large, and a temperature of the secondary air supply apparatus is likely to be increased, as compared to when failure has not occurred in the first opening/closing valve. Accordingly, in the case where failure has occurred in at least one of the second opening/closing valve and the third opening/closing valve, when failure has occurred in the first opening/closing valve, the amount of the air introduced into the internal combustion engine is controlled to be reduced, as compared to when failure has not occurred in the first opening/closing valve.

When failure has occurred in both of the second opening/closing valve and the third opening/closing valve, communication is provided between the cylinder connected to the second air passage and the cylinder connected to the third air passage. Therefore, the exhaust gas flows back to the secondary air supply apparatus from both of the cylinder connected to the second air passage and the cylinder connected to the third air passage. Therefore, when failure has occurred in both of the second opening/closing valve and the third opening/closing valve, the amount of the exhaust gas flowing back to the secondary air supply apparatus becomes large, as compared to when failure has occurred in one of the second opening/closing valve and the third opening/closing valve. Accordingly, when failure has occurred in both of the second opening/closing valve and the third opening/closing valve, the amount of the air introduced into the internal combustion engine is controlled to be reduced, as compared to when failure has occurred in one of the second opening/closing valve and the third opening/closing valve. Thus, the amount of the discharged exhaust gas can be reduced. Therefore, it is possible to reduce the amount of the exhaust gas flowing back to the secondary air supply apparatus, and to suppress an increase in the temperature of the secondary air supply apparatus. As a result, it is possible to suppress occurrence of secondary failure.

According to a fifth aspect of the invention, in the control apparatus according to the fourth aspect of the invention, when failure has occurred in at least one of the second opening/closing valve and the third opening/closing valve, and the first opening/closing valve, the controller may limit the amount of the air introduced into the internal combustion engine so that the amount of the air introduced into the internal combustion engine is reduced, as compared to when failure has not occurred in at least one of the second opening/closing valve and the third opening/closing valve, and failure has not occurred in the first opening/closing valve.

According to the fifth aspect of the invention, in a case where the failure has occurred in at least one of the second opening/closing valve and the third opening/closing valve, when failure has occurred in the first opening/closing valve, the amount of the air introduced into the internal combustion engine is controlled to be reduced, as compared to when failure has not occurred in the first opening/closing valve. When failure has occurred in at least one of the second opening/closing valve and the third opening/closing valve and failure has occurred in the first opening/closing valve, the exhaust gas flowing back to the secondary air supply apparatus passes through the first air passage. Therefore, when failure has occurred in the first opening/closing valve, the amount of the exhaust gas flowing back to the secondary air supply apparatus is large, and a temperature of the secondary air supply apparatus is likely to be increased, as compared to when failure has not occurred in the first opening/closing valve. Accordingly, when failure has occurred in the first opening/closing valve, the amount of the air introduced into the internal combustion engine is reduced, as compared to when failure has not occurred in the first opening/closing valve. Thus, the amount of the exhaust gas flowing back to the secondary air supply apparatus can be reduced. Therefore, it is possible to suppress an increase in the temperature of the secondary air supply apparatus, which is caused by the exhaust gas flowing back to the secondary air supply apparatus. As a result, it is possible to suppress occurrence of secondary failure.

According to a sixth aspect of the invention, in the control apparatus according to the fourth aspect of the invention, when failure has occurred in the second opening/closing valve and the third opening/closing valve, the controller may limit the amount of the air introduced into the internal combustion engine so that the amount of the air introduced into the internal combustion engine is reduced, as compared to when failure has occurred in one of the second opening/closing valve and the third opening/closing valve.

According to the sixth aspect of the invention, when failure has occurred in the second opening/closing valve and the third opening/closing valve, the amount of the air introduced into the internal combustion engine is reduced, as compared to when failure has occurred in one of the second opening/closing valve and the third opening/closing valve. When failure has occurred in both of the second opening/closing valve and the third opening/closing valve, communication is provided between the cylinder connected to the second air passage and the cylinder connected to the third air passage, and the exhaust gas flows back to the secondary air supply apparatus from both of the second air passage and the third air passage. Therefore, when failure has occurred in both of the second opening/closing valve and the third opening/closing valve, the amount of the exhaust gas flowing back to the secondary air supply apparatus is large, as compared to when failure has occurred in one of the second opening/closing valve and the third opening/closing valve. Accordingly, when failure has occurred in both of the second opening/closing valve and the third opening/closing valve, the amount of the air introduced into the internal combustion engine is controlled to be reduced, as compared to when failure has occurred in one of the second opening/closing valve and the third opening/closing valve. Thus, the amount of the discharged exhaust gas can be reduced. Accordingly, it is possible to reduce the amount of the exhaust gas flowing back to the secondary air supply apparatus, and to suppress an increase in the temperature of the secondary air supply apparatus. As a result, it is possible to suppress occurrence of secondary failure.

According to a seventh aspect of the invention, in the control apparatus according to any one of the first aspect to the sixth aspect of the invention, the controller may control an opening amount of a throttle valve provided in an intake pipe for the internal combustion engine so that the amount of the air introduced into the internal combustion engine is limited to the predetermined amount.

A ninth aspect of the invention relates to a control method for an internal combustion engine provided with a secondary air supply apparatus that supplies secondary air to a portion upstream of an exhaust gas control device in an exhaust system. The control method includes a step of detecting failure in the secondary air supply apparatus; and a step of limiting an amount of air introduced into the internal combustion engine to a predetermined amount when failure in the secondary air supply apparatus is detected in the step of detecting failure.

DETAILED DESCRIPTION OF THE EXEMPLARY EMBODIMENTS

Hereinafter, an embodiment of the invention will be described with reference to the drawings. In the following description, the same components are denoted by the same reference numerals, and names and functions thereof are the same. Therefore, detailed description thereof will not be repeated.

Figure 1:
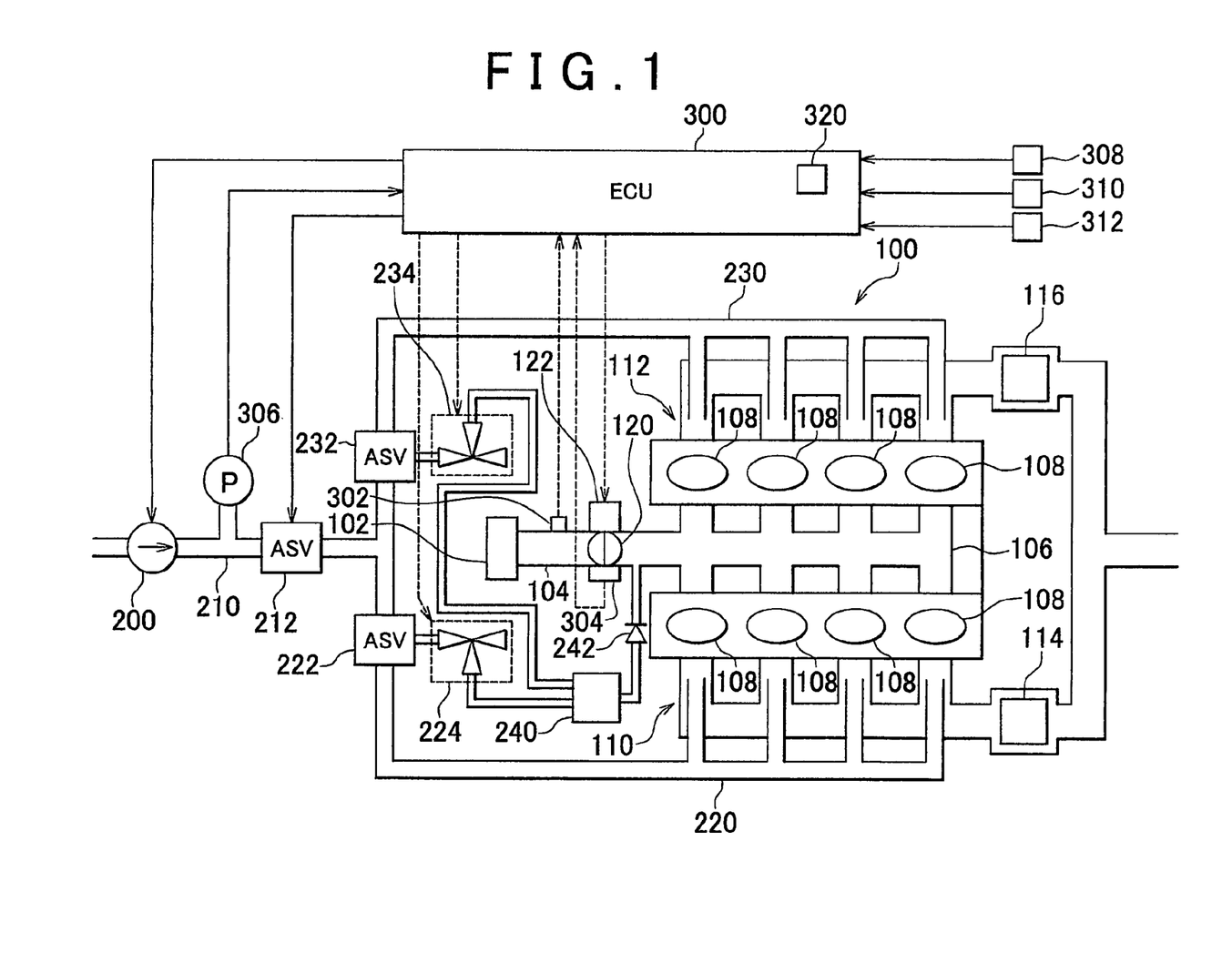
FIG. 1 is a control block diagram showing an engine which is controlled by a control apparatus for an internal combustion engine according to an embodiment of the invention.

Referring to FIG. 1, description will be made of a vehicle including a control apparatus for an internal combustion engine according to the embodiment of the invention. The vehicle includes an engine 100, and an electronic control unit (hereinafter, referred to as "ECU") 300. The control apparatus for an internal combustion engine according to the embodiment of the invention is realized, for example, by a program executed by the ECU 300.

The engine 100 is a V-type engine. The engine 100 is not limited to the V-type engine. Air is taken through an air cleaner 102, and then is introduced into the engine 100 via an intake pipe 104 and an intake manifold 106. The air is introduced into a combustion chamber of each of eight cylinders 108 from the intake manifold 106, together with fuel injected from an injector (not shown). The number of the cylinders is not limited to eight.

Air-fuel mixture introduced into each cylinder 108 is ignited by an ignition plug (not shown), and burned. Thus, the engine 100 generates driving force. The burned air-fuel mixture, that is, exhaust gas is guided to exhaust manifolds 110 and 112 that are connected to the cylinders 108. After purified by catalysts 114 and 116, the exhaust gas is discharged to the outside of the vehicle. An amount of air introduced into the engine 100 is controlled by a throttle valve 120. An opening amount of the throttle valve 120 is controlled by an actuator 122.

When the catalysts 114 and 116 are cold, the purifying capability of the catalysts 114 and 116 cannot be fully used. Therefore, secondary air is supplied to the exhaust manifolds 110 and 112. Since the secondary air is supplied, CO and HC in the exhaust gas are burned and changed to $CO_2$ and $H_2O$ due to chemical reaction.

In this embodiment of the invention, as the secondary air, air in an engine room is used. In order to supply the secondary air, an air pump 200 is provided. The air pump 200 delivers, under pressure, air in the engine room into a first air passage 210.

An electromagnetic air switching valve (hereinafter, referred to as "ASV") 212 is provided downstream of the air pump 200 in the first air passage 210. The state of the electromagnetic ASV 212 is selectively changed between an opened state and a closed state based on a control signal sent from the ECU 300. Thus, the electromagnetic ASV 212 can open/close the first air passage 210. A second air passage 220 and a third air passage 230 are connected to the first air passage 210.

One end of the second air passage 220 is connected to the first air passage 210 at a portion downstream of the electromagnetic ASV 212. The other end of the second air passage 220 is connected to the exhaust manifold 110 which is connected to one bank of the engine 100. That is, the other end of the second air passage 220 is connected to the exhaust passage leading to cylinders 108 provided in the one bank of the engine 100.

Similarly, one end of the third air passage 230 is connected to the first air passage 210 at a portion downstream of the electromagnetic ASV 212. The other end of the third air passage 230 is connected to the exhaust manifold 112 which is connected to the other bank of the engine 100. That is, the other end of the third air passage 230 is connected to the exhaust passage leading to cylinders 108 which are different from the cylinders 108 to which the exhaust passage connected to the second air passage 220 leads.

A vacuum pressure ASV (1) 222 is provided in the second air passage 220. The vacuum ASV (1) 222 is connected to a vacuum switching valve (hereinafter, referred to as "VSV") 224. Similarly, a vacuum pressure ASV (2) 232 is provided in the third air passage 230. The vacuum pressure ASV (2) 232 is connected to a vacuum switching valve (hereinafter, referred to as "VSV") 234.

The VSVs 224 and 234 are connected to a vacuum pressure tank 240. The vacuum pressure tank 240 is connected to an intake pipe 104 at a portion downstream of the throttle valve 120 via a check valve 242.

The air pump 200, the air passages, the ASVs, the VSVs, the vacuum pressure tank 240, and the check valve 242 constitute an air injection system (hereinafter, referred to as "AI system") which serves as a secondary air supply apparatus.

The check valve 242 allows air to flow from the vacuum tank 240 to the intake pipe 104. In addition, the check valve 242 prohibits the air from flowing from the intake pipe 104 to the vacuum pressure tank 240. Thus, a pressure in the vacuum pressure tank 104 becomes a vacuum pressure.

On the basis of the control signal sent from the ECU 300, the VSV 224 switches between a state in which the vacuum pressure is introduced from the vacuum pressure tank 240 to the vacuum pressure ASV (1) 222, and a state in which an atmospheric pressure is introduced to the vacuum pressure ASV (1) 222. In the case where the vacuum pressure is introduced from the vacuum pressure tank 240 to the vacuum pressure ASV (1) 222, the vacuum ASV (1) 222 is opened. In the case where the atmospheric pressure is introduced to the vacuum pressure ASV (1) 222, the vacuum pressure ASV (1) 222 is closed. Thus, the vacuum pressure ASV (1) 222 can open/close the second air passage 220.

Similarly, on the basis of the control signal sent from the ECU 300, the VSV 234 switches between a state in which the vacuum pressure is introduced from the vacuum pressure tank 240 to the vacuum pressure ASV (2) 232, and a state in which the atmospheric pressure is introduced to the vacuum pressure ASV (2) 232. In the case where the vacuum pressure is introduced from the vacuum pressure tank 240 to the vacuum pressure ASV (2) 232, the vacuum pressure ASV (2) 232 is opened. In the case where the atmospheric pressure is introduced to the vacuum pressure ASV (2) 232, the vacuum pressure ASV (2) 232 is closed. Thus, the vacuum pressure ASV (2) 232 can open/close the third air passage 230.

In a case where the electromagnetic ASV 212, the vacuum pressure ASV (1) 222, and the vacuum pressure ASV (2) 232 are opened, air delivered under pressure from the air pump 200 is supplied to the exhaust manifolds 110 and 112 via the first air passage 210, the second air passage 220, and the third air passage 230. Thus, secondary air is supplied to the exhaust passages connected to each cylinder 108.

The ECU 300 receives signals indicating results of detection performed by an air flow meter 302, a throttle valve opening amount sensor 304, a pressure sensor 306, a vehicle speed sensor 308, a crank position sensor 310, and a coolant temperature sensor 312.

The air flow meter 302 detects an amount of air introduced into the engine 100. The throttle valve opening amount sensor 304 detects a throttle valve opening amount. The pressure sensor 306 is provided between the air pump 200 and the electromagnetic ASV 212, and detects a pressure in the first air passage 210. The vehicle speed sensor 308 detects a rotational speed of a vehicle wheel (not shown). The ECU 300 detects a vehicle speed based on the rotational speed of the vehicle wheel detected by the vehicle speed sensor 308. The crank position sensor 310 detects a rotational speed of a crank shaft (not shown) of the engine 100, that is, an engine rotational speed NE. The coolant sensor 312 detects a temperature of coolant of the engine 100.

The ECU 300 performs computations based on the signals sent from the sensors, and maps and programs stored in memory 320. Thus, the ECU 300 controls devices installed in the vehicle so that the vehicle is brought into a desired state.

Figure 2:
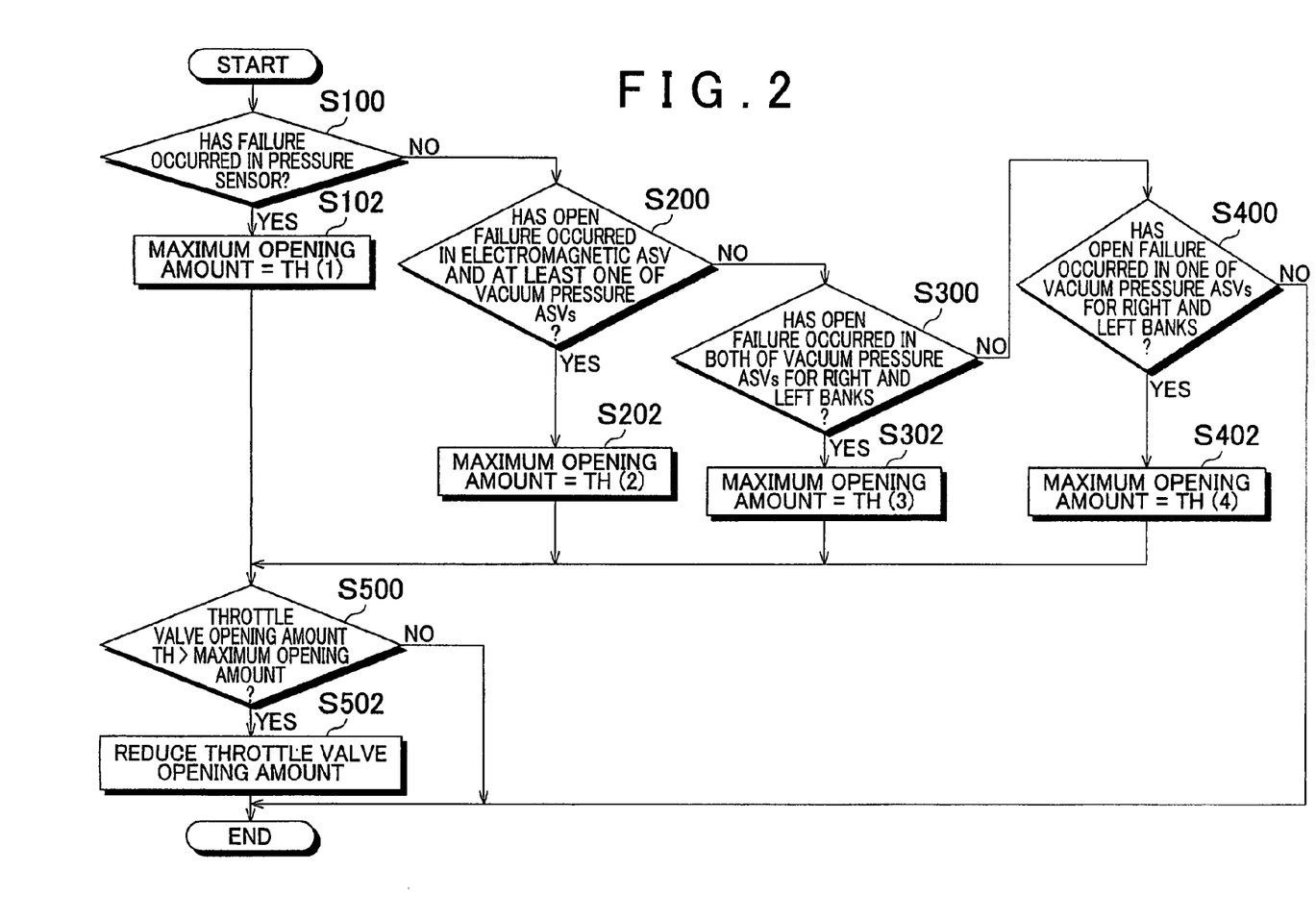
FIG. 2 is a flowchart showing a control structure of a program which is executed by an ECU of the control apparatus for an internal combustion engine according to the embodiment of the invention.

Referring to FIG. 2, description will be made of a control structure of a program executed by the ECU 300 of the control apparatus for an internal combustion engine according to this embodiment.

In step S100, the ECU 300 determines whether failure has occurred in the pressure sensor 306. Whether failure has occurred in the pressure sensor 306 is determined based on whether the pressure detected by the pressure sensor 306 increases while the electromagnetic ASV 212, the vacuum pressure ASV (1) 222, and the vacuum pressure ASV (2) 232 are controlled so as to be closed, and the air pump 200 is operated. However, the method of determining whether failure has occurred in the pressure sensor 306 is not limited to this method. When it is determined that failure has occurred in the pressure sensor 306 ("YES" in step S100), step S102 is performed. When failure has not occurred in the pressure sensor 306 ("NO" in step S100), step S200 is performed. In step S102, the ECU 300 limits the maximum opening amount of the throttle valve 120 to a predetermined opening amount TH (1).

In step S200, the ECU 300 determines whether at least one of the vacuum pressure ASV (1) 222 and the vacuum pressure ASV (2) 232, and the electromagnetic ASV 212 remain in the opened state and cannot be closed (hereinafter, this failure will be referred to as "open failure"). Whether open failure has occurred at least one of the vacuum pressure ASV (1) 222 and the vacuum pressure ASV (2) 232, and the electromagnetic ASV 212 is determined, for example, based on whether there is a pulsation (change) of the pressure detected by the pressure sensor 306 while the operation of the air pump 200 is stopped, and all of the electromagnetic ASV 212, the vacuum pressure ASV (1) 222, and the vacuum pressure ASV (2) are controlled so as to be closed. However, the method of determining whether open failure has occurred in at least one of the vacuum ASV (1) 222 and the vacuum pressure ASV (2) 232, and the electromagnetic ASV 212 is not limited to this method.

When it is determined that open failure has occurred in at least one of the vacuum pressure ASV (1) 222 and the vacuum pressure ASV (2) 232, and the electromagnetic ASV 212 ("YES" in step S200), step S202 is performed. When it is determined that open failure has occurred in at least one of the vacuum pressure ASV (1) 222 and the vacuum pressure ASV (2) 232, and open failure has not occurred in the electromagnetic ASV 212 ("NO" in step S200), step S300 is performed. In step S202, the ECU 300 limits the maximum opening amount of the throttle valve 120 to a predetermined opening amount TH (2).

In step S300, since the electromagnetic ASV 212 is normal, the ECU 300 determines whether open failure has occurred in both of the vacuum pressure ASV (1) 222 and the vacuum pressure ASV (2) 232. Whether open failure has occurred in both of the vacuum pressure ASV (1) 222 and the vacuum pressure ASV (2) 232 is determined, for example, based on whether a short has occurred in a wire connection which connects the ECU 300 to the VSV 224 and a wire connection which connects the ECU 300 to the VSV 234. However, the method of determining whether open failure has occurred in both of the vacuum pressure ASV (1) 222 and the vacuum pressure ASV (2) 232 is not limited to this method.

When it is determined that open failure has occurred in both of the vacuum pressure ASV (1) 222 and the vacuum pressure ASV (2) 232 ("YES" in step S300), step S302 is performed. When it is determined that open failure has occurred in one of the vacuum pressure ASV (1) 222 and the vacuum pressure ASV (2) 232, or open failure has occurred in neither the vacuum pressure ASV (1) 222 nor the vacuum pressure ASV (2) 232 ("NO" in step S300), step S400 is performed. In step S302, the ECU 300 limits the maximum opening amount of the throttle valve 120 to a predetermined opening amount TH (3) (TH (3) is larger than TR (2), i.e., TH (3)>TH (2)).

In step S400, the ECU 300 determines whether open failure has occurred in one of the vacuum pressure ASV (1) 222 and the vacuum pressure ASV (2) 232. Whether open failure has occurred in one of the vacuum pressure ASV (1) 222 and the vacuum pressure ASV (2) 232 is determined, for example, based on whether a short has occurred in the wire connection which connects the ECU 300 to the VSV 224 and the wire connection which connects the ECU 300 to the VSV 234. However, the method of determining whether open failure has occurred in one of the vacuum pressure ASV (1) 222 and the vacuum pressure ASV (2) 232 is not limited to this method.

When it is determined that open failure has occurred in one of the vacuum pressure ASV (1) 222 and the vacuum pressure ASV (2) 232 ("YES" in step S400), step S402 is performed. When it is determined that open failure has occurred in neither the vacuum pressure ASV (1) 222 nor the vacuum pressure ASV (2) 232 ("NO" in step S400), the routine is ended. In step S402, the ECU 300 limits the maximum opening amount of the throttle valve 120 to a predetermined opening amount TH (4) (TH (4) is larger than TH (3), i.e., TH (4)>TH (3)).

In step S500, the ECU 300 determines whether a throttle valve opening amount TH is larger than the limited maximum opening amount. When it is determined that the throttle valve opening amount TH is larger than the limited maximum opening amount ("YES" in step S500), step S502 is performed. When it is determined that the throttle valve opening amount TH is equal to or smaller than the limited maximum opening amount ("NO" in step S500), the routine is ended. In step S502, the ECU 300 reduces the throttle opening amount TH to the limited maximum opening amount.

Hereinafter, description will be made of operation of the ECU 300 according to this embodiment of the invention, based on the structure and the flowchart that have been described.

While a vehicle system is being started, if the pressure detected by the pressure sensor 306 does not increase while all the ASVs are controlled so as to be closed and the air pump 200 is operated, it is determined that failure has occurred in the pressure sensor 306 ("YES" in step S100).

In this case, it cannot be determined whether open failure has occurred in at least one of the vacuum pressure ASV (1) 222 and the vacuum pressure ASV (2) 232, and the electromagnetic ASV 212, based on whether a change in the pressure is detected.

When open failure has occurred in at least one of the vacuum pressure ASV (1) 222 and the vacuum pressure ASV (2) 232, and the electromagnetic ASV 212, exhaust gas may flow back to the AI system. When the exhaust gas flows back to the AI system, secondary failure may be caused due to heat of the exhaust gas, that is, failure may be caused in a component that has been normal due to the heat of the exhaust gas.

Accordingly, when it is determined that failure has occurred in the pressure sensor 306 ("YES" in step S100), the maximum opening amount of the throttle valve 120 is limited to TH (1) in case open failure has occurred at least one of the vacuum pressure ASV (1) 222 and the vacuum pressure ASV (2) 232, and the electromagnetic ASV 212 (S102).

Thus, an air amount GA that is an amount of air introduced into the engine 100 is reduced, and an amount of exhaust gas is reduced. Therefore, it is possible to reduce an amount of the exhaust gas that flows back to the AI system. As a result, when open failure has occurred in at least one of the vacuum pressure ASV (1) 222 and the vacuum pressure ASV (2) 232, and the electromagnetic ASV 212, it is possible to suppress occurrence of secondary failure due to heat of the exhaust gas flowing back to the AI system.

In the case where the pressure sensor 306 is normal ("NO" in step S100), when a change in the pressure is detected while all of the ASVs are controlled so as to be closed, and the air pump 200 is controlled so as to be stopped, it is determined that open failure has occurred in at least one of the vacuum pressure ASV (1) 222 and the vacuum pressure ASV (2) 232, and the electromagnetic ASV 212 (S200).

When it is determined that open failure has occurred in at least one of the vacuum pressure ASV (1) 222 and the vacuum pressure ASV (2) 232, and the electromagnetic ASV 212 ("YES" in step S200), the exhaust gas flows back to the first air passage 210 via at least one of the second air passage 220 and the third air passage 230. The exhaust gas that flowing back to the first air passage 210 flows into the engine room.

In this case, while the engine 100 is being operated, the high-temperature exhaust gas may constantly flow back to the AI system, and secondary failure may be caused due to heat of the exhaust gas flowing back to the AI system. Therefore, the maximum opening amount of the throttle valve 120 is limited to TH (2) (S202).

Thus, the air amount GA that is the amount of the air introduced into the engine 100 is reduced, and the amount of the exhaust gas is reduced. Therefore, it is possible to reduce the amount of the exhaust gas flowing back to the AI system. As a result, it is possible to suppress occurrence of secondary failure due to heat of the exhaust gas flowing back to the AI system.

Since the electromagnetic ASV 212 is normal ("NO" in step S200), when a short has occurred in the wire connection between the VSV 224 and the ECU 300 and the wire connection between the VSV 234 and the ECU 300, it is determined that open failure has occurred in both of the vacuum pressure ASV (1) 222 and the vacuum pressure ASV (2) 232 ("YES" in step S300), even if a change in the pressure is not detected.

When it is determined that open failure has occurred in both of the vacuum pressure ASV (1) 222 and the vacuum pressure ASV (2) 232 ("YES" in step S300), communication is provided between the cylinders connected to the second air passage 220 and the cylinders connected to the third air passage 230. In this case, the exhaust gas may flow back to the AI system from both of the cylinders connected to the second air passage 220 and the cylinders connected to the third air passage 230, and secondary failure may be caused due to heat of the exhaust gas flowing back to the AI system. Therefore, the maximum opening amount of the throttle valve 120 is limited to TH (3) (S302).

Thus, the air amount GA that is the amount of the air introduced into the engine 100 is reduced, and the amount of the exhaust gas is reduced. Therefore, it is possible to reduce the amount of the exhaust gas flowing back to the AI system. As a result, it is possible to suppress occurrence of secondary failure due to heat of the exhaust gas flowing back to the AI system.

In the case where it is determined that open failure has occurred in one of the vacuum pressure ASV (1) 222 and the vacuum pressure ASV (2) 232, or open failure has occurred in neither the vacuum pressure ASV (1) 222 nor the vacuum pressure ASV (2) 232 ("NO" in step S300), when a short has occurred in one of the wire connection between the VSV 224 and the ECU 300 and the wire connection between the VSV 234 and the ECU 300, it is determined that open failure has occurred in one of the vacuum pressure ASV (1) 222 and the vacuum pressure ASV (2) 232 ("YES" in step S400).

When it is determined that open failure has occurred in at least one of the vacuum pressure ASV (1) 222 and the vacuum pressure ASV (2) 232 ("YES" in step S300), the exhaust gas flows back to the AI system from one of the cylinders connected to the second air passage 220 and the cylinders connected to the third air passage 230. Therefore, secondary failure may be caused due to heat of the exhaust gas flowing back to the AI system. In this case, the opening amount of the throttle valve 120 is limited to TH (4) (S402).

Thus, the air amount GA that is the amount of the air introduced into the engine 100 is reduced, and the amount of the exhaust gas is reduced. Therefore, it is possible to reduce the amount of the exhaust gas flowing back to the AI system. As a result, it is possible to suppress occurrence of secondary failure due to heat of the exhaust gas flowing back to the AI system.

When open failure has occurred in at least one of the vacuum pressure ASV (1) 222 and the vacuum pressure ASV (2) 232, and the electromagnetic ASV 212, the exhaust gas flowing back to the AI system flows into the engine room via at least one of the second air passage 220 and the third air passage 230, and the first air passage 210. Thus, when open failure has occurred in at least one of the vacuum pressure ASV (1) 222 and the vacuum pressure ASV (2) 232, and the electromagnetic ASV 212, the amount of the exhaust gas flowing back to the AI system becomes largest, and secondary failure is likely to occur.

Also, when open failure has occurred in both of the vacuum pressure ASV (1) 222 and the vacuum pressure ASV (2) 232, communication is provided between the exhaust manifold 110 and the exhaust manifold 112 via the second air passage 220 and the third air passage 230. Therefore, the exhaust gas flows back to the AI system from both of the cylinders connected to the second air passage 220 and the cylinders connected to the third air passage 230.

Meanwhile, when open failure has occurred in one of the vacuum pressure ASV (1) 222 and the vacuum pressure ASV (2) 232, the exhaust gas flows back to the AI system from one of the cylinders connected to the second air passage 220 and the cylinders connected to the third air passage 230.

Therefore, when open failure has occurred in both of the vacuum pressure ASV (1) 222 and the vacuum pressure ASV (2) 232, the amount of the exhaust gas flowing back to the AI system is large, and secondary failure is likely to occur, as compared to when open failure has occurred in one of the vacuum pressure ASV (1) 222 and the vacuum pressure ASV (2) 232.

Accordingly, among the limited maximum opening amounts of the throttle valve 120, TH (2) is the smallest, and TH (4) is the largest. Thus, the throttle valve opening amount TH is limited so that the amount of the air introduced into the engine 100 becomes smaller as the amount of the exhaust gas flowing back to the AI system becomes larger.

Hereinafter, description will be made on the assumption that open failure has occurred in at least one of the vacuum pressure ASV (1) 222 and the vacuum pressure ASV (2) 232, and the electromagnetic ASV 212 ("YES" in step S200), and the maximum opening amount of the throttle valve 120 is limited to TH (2) (S202).

After the maximum opening amount of the throttle valve 120 is limited, it is determined whether the throttle valve opening amount TH is larger than TH (2) (S500). When it is determined that the throttle valve opening amount TH is larger than TH (2) ("YES" in step S500), the throttle valve opening amount TH is reduced to TH (2).

Figure 3:
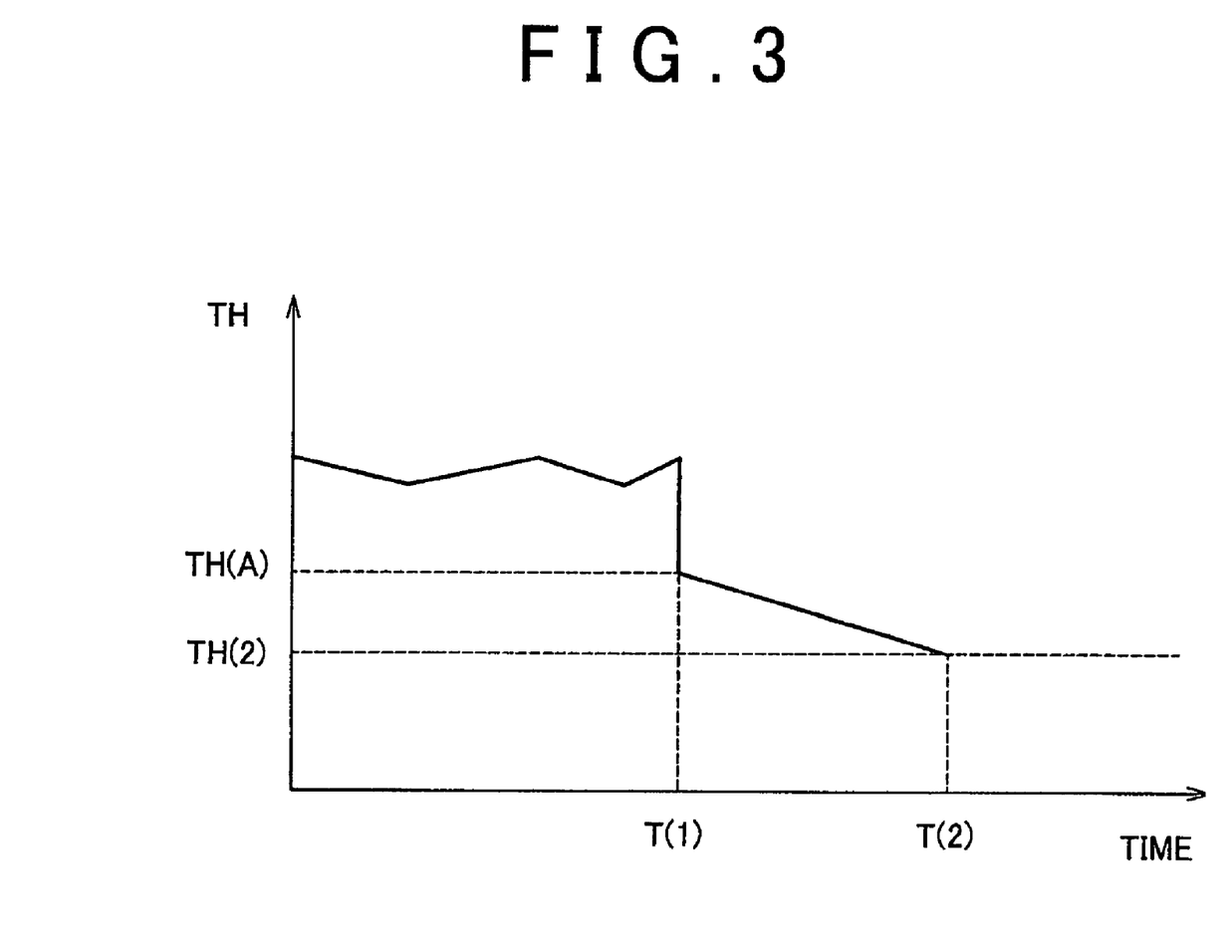
FIG. 3 is a timing chart showing a change of a throttle valve opening amount TH.

At this time, as shown in FIG. 3, the throttle valve opening amount TH is reduced to TH (A) which is larger than TH (2) at a time point T (1). Then, the throttle valve opening amount TH is reduced at a predetermined change rate until the throttle valve opening amount TH becomes equal to TH (2) at a time point T (2). Thus, a rapid change in the throttle valve opening amount TH is suppressed. Therefore, a rapid decrease in the output of the engine 100 is suppressed. As a result, it is possible to reduce the possibility that an occupant feels uncomfortable when the throttle valve opening amount TH is limited. The throttle valve opening amount TH may be reduced plural times in a stepwise manner until the throttle valve opening amount TH becomes equal to TH (A). Also, the throttle valve opening amount TH may be reduced to TH (2) in a stepwise manner, or at a predetermined change rate.

As described above, the ECU of the control apparatus for an internal combustion engine according to this embodiment of the invention limits the maximum opening amount of the throttle valve opening amount TH to the predetermined opening amount when failure in the secondary air supply apparatus is detected. Thus, the amount of the exhaust gas can be reduced. Therefore, the amount of the exhaust gas flowing back to the secondary air supply apparatus can be reduced. As a result, it is possible to suppress occurrence of secondary failure due to heat of the exhaust gas flowing back to the secondary air supply apparatus.

Thus, the embodiment of the invention that has been disclosed in the specification is to be considered in all respects as illustrative and not restrictive. The technical scope of the invention is defined by claims, and all changes which come within the meaning and range of equivalency of the claims are therefore intended to be embraced therein.

What is claimed is:

1. A control method for an internal combustion engine provided with a secondary air supply apparatus that supplies secondary air to a portion upstream of an exhaust gas control device in an exhaust system, the method comprising:
    a step of detecting failure in the secondary air supply apparatus; and
    a step of limiting an amount of air introduced into a cylinder via an intake manifold of the internal combustion engine to a predetermined amount when failure in the secondary air supply apparatus is detected in the step of detecting failure,
    wherein the internal combustion engine includes plural cylinders; and the secondary air supply apparatus includes i) a first opening/closing valve which opens/closes a first air passage through which air discharged from an air pump flows; ii) a second opening/closing valve which opens/closes a second air passage one end of which is connected to the first air passage at a portion downstream of the first opening/closing valve, and the other end of which is connected to an exhaust passage leading to a predetermined cylinder among the plural cylinders; and iii) a third opening/closing valve which opens/closes a third air passage one end of which is connected to the first air passage at a portion downstream of the first opening/closing valve, and the other end of which is connected to an exhaust passage leading to a cylinder different from the predetermined cylinder to which the exhaust passage connected to the second air passage leads, and
    wherein in the step of detecting failure a detector detects presence or absence of failure in each of the first opening/closing valve, the second opening/closing valve, and the third opening/closing valve; and the controller limits the amount of the air introduced into the internal combustion engine according to presence or absence of failure in each of the first opening/closing valve, the second opening/closing valve, and the third opening/closing valve.

2. The control method apparatus for an internal combustion engine according to claim 1, wherein in the step of limiting the amount of the air introduced into the cylinder via the intake manifold of the internal combustion engine to the predetermined amount, the air is reduced in a stepwise manner.

3. A control apparatus for an internal combustion engine provided with a secondary air supply apparatus that supplies secondary air to a portion upstream of an exhaust gas control device in an exhaust system, the apparatus comprising:
    a detector that detects failure in the secondary air supply apparatus; and
    a controller that limits an amount of air introduced into the internal combustion engine to a predetermined amount when failure in the secondary air supply apparatus is detected by the detector, wherein the internal combustion engine includes plural cylinders; and the secondary air supply apparatus includes i) a first opening/closing valve which opens/closes a first air passage through which air discharged from an air pump flows; ii) a second opening/closing valve which opens/closes a second air passage one end of which is connected to the first air passage at a portion downstream of the first opening/closing valve, and the other end of which is connected to an exhaust passage leading to a predetermined cylinder among the plural cylinders; and iii) a third opening/closing valve which opens/closes a third air passage one end of which is connected to the first air passage at a portion downstream of the first opening/closing valve, and the other end of which is connected to an exhaust passage leading to a cylinder different from the predetermined cylinder to which the exhaust passage connected to the second air passage leads, and wherein the detector detects presence or absence of failure in each of the first opening/closing valve, the second opening/closing valve, and the third opening/closing valve; and the controller limits the amount of the air introduced into the internal combustion engine according to presence or absence of failure in each of the first opening/closing valve, the second opening/closing valve, and the third opening/closing valve.

4. The control apparatus for an internal combustion engine according to claim 3, wherein the controller reduces the amount of the air introduced into the internal combustion engine to the predetermined amount at a predetermined change rate.

5. The control apparatus for an internal combustion engine according to claim 3, wherein, when failure has occurred in at least one of the second opening/closing valve and the third opening/closing valve, and the first opening/closing valve, the controller limits the amount of the air introduced into the internal combustion engine so that the amount of the air introduced into the internal combustion engine is reduced, as compared to when failure has occurred in at least one of the second opening/closing valve and the third opening/closing valve, and failure has not occurred in the first opening/closing valve.

6. The control apparatus for an internal combustion engine according to claim 3, wherein, when failure has occurred in the second opening/closing valve and the third opening/closing valve, the controller limits the amount of the air introduced into the internal combustion engine so that the amount of the air introduced into the internal combustion engine is reduced, as compared to when failure has occurred in one of the second opening/closing valve and the third opening/closing valve.

7. The control apparatus for an internal combustion engine according to claim 3, wherein the controller controls an opening amount of a throttle valve provided in an intake pipe for the internal combustion engine so that the amount of the air introduced into the internal combustion engine is limited to the predetermined amount.

8. The control apparatus for an internal combustion engine according to claim 3, wherein the controller reduces the amount of the air introduced into the internal combustion engine to the predetermined amount in a stepwise manner.

* * * * *

UNITED STATES PATENT AND TRADEMARK OFFICE
CERTIFICATE OF CORRECTION

PATENT NO. : 7,637,097 B2  Page 1 of 1
APPLICATION NO. : 10/578923
DATED : December 29, 2009
INVENTOR(S) : Tomokazu Muraguchi et al.

It is certified that error appears in the above-identified patent and that said Letters Patent is hereby corrected as shown below:

| Column | Line | |
|--------|------|---|
| 9 | 42 | After "occurred" insert --in--. |
| 9 | 66 | After "that" insert --is--. |
| 11 | 59 | Change "plural times" to --many times--. |
| 12 | 52 | After "control method" delete "apparatus". |

Signed and Sealed this

Twenty-third Day of March, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,637,097 B2 | Page 1 of 1 |
| APPLICATION NO. | : 10/578923 | |
| DATED | : December 29, 2009 | |
| INVENTOR(S) | : Muraguchi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 460 days.

Signed and Sealed this

Ninth Day of November, 2010

David J. Kappos
*Director of the United States Patent and Trademark Office*